No. 630,094. Patented Aug. 1, 1899.
W. L. NOBLE.
ROTARY KNIFE.
(Application filed July 21, 1897.)

(No Model.)

Witnesses
W. W. Hollingsworth
Victor J. Evans

Inventor
William L. Noble
By John Wedderburn
Attorney

UNITED STATES PATENT OFFICE.

WILLIAM L. NOBLE, OF ROE, WEST VIRGINIA.

ROTARY KNIFE.

SPECIFICATION forming part of Letters Patent No. 630,094, dated August 1, 1899.

Application filed July 21, 1897. Serial No. 645,392. (No model.)

*To all whom it may concern:*

Be it known that I, WILLIAM L. NOBLE, of Roe, in the county of Kanawha and State of West Virginia, have invented certain new and useful Improvements in Rotary Knives; and I do hereby declare the following to be a full, clear, and exact description of the invention, such as will enable others skilled in the art to which it appertains to make and use the same.

This invention relates to improvements in rotary knives; and the object of the same is to provide a knife for cutting cigar-wrappers or for any other purpose where a rotary knife is desired with an attachment whereby said knife may be readily and conveniently sharpened upon the whetstone.

The invention consists in the novel features of construction hereinafter more particularly set forth and claimed.

Figure 1:
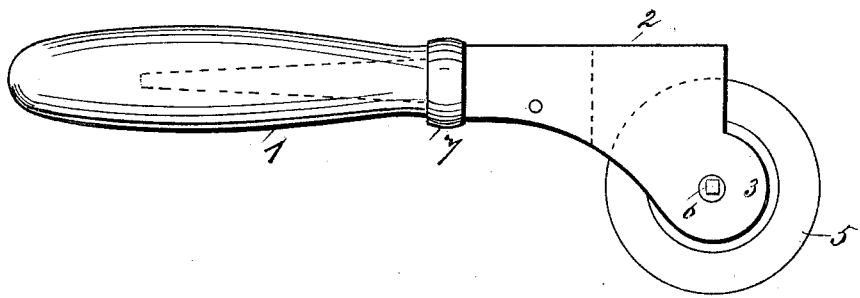
Figure 2:
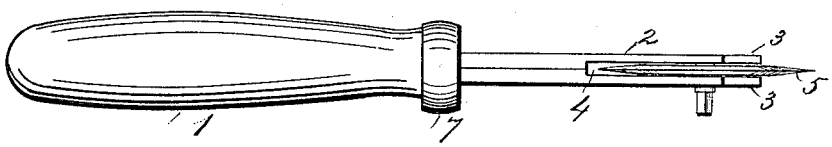
Figure 2:
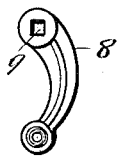

In the accompanying drawings, forming a part of this specification, Figure 1 is a side elevation. Fig. 2 illustrates the cutter with the detachable crank for the purpose of assisting in the sharpening of the cutter.

Referring to the numerals on the drawings, 1 indicates the handle, and 2 the stem, which is provided with the ears 3 at its lower forward end and slotted vertically, as illustrated at 4. Pivoted within this slot between the ears 3 is the cutting-disk 5, which has its periphery sharpened to form a cutting edge. This disk is rotatably secured within the stem or shank by a shaft 6, which is journaled in the ears, one end of said shaft extending through one of the ears and squared, as illustrated. The shaft or stem is secured to the handle by the ferrule 7.

For the purpose of assisting in the grinding or sharpening of the cutting-disk I provide the crank 8, having the square orifice 9, which is adapted to receive the squared end of the shaft when the crank is positioned thereon.

When it is desired to grind the cutting-disk, the same is held in engagement with the whetstone and rotated by the aid of the crank, which quickly and readily sharpens the cutting edge, making the same uniform throughout its entire circumference.

From the above description it will be seen that I have produced a simple rotary knife and also a device for assisting in the grinding of the same which is readily attached to or detached from the shaft of the cutting-disk.

Having thus described my invention, what I claim as new, and desire to secure by Letters Patent, is—

1. A hand rotary knife comprising a handle, a shaft journaled in said handle, a disk cutter fast on said shaft, and a crank-arm on said shaft, for the purpose and substantially as described.

2. In a rotary knife adapted to be operated by hand, the shaft which carries the circular rotary knife extended outside of its bearing in the handle and squared on its extended end to adapt it to receive a detachable means for rotating the knife in contact with a whetstone, substantially as described.

3. As a new article of manufacture, a rotary knife comprising a handle for operating it, and a shaft journaled in said handle and carrying the circular knife fast thereon, said shaft projecting at one side outside of its bearing and being squared on said projecting end to adapt it to receive a removable crank-arm, substantially as described.

4. As a new article of manufacture, a rotary knife comprising a suitable handle, a slotted shank secured in said handle, a shaft journaled in bearings in said shank and provided with a polygonally-shaped, projecting end, a cutter-disk secured to said shaft to rotate with it, and a removable crank-arm adapted to engage the projecting end of the shaft for rotating the cutter-disk in contact with a grinding-surface, all substantially as and for the purpose described.

In testimony whereof I have signed this specification in the presence of two subscribing witnesses.

WILLIAM L. NOBLE.

Witnesses:
 N. C. SAUNDERS,
 M. C. GEFISFOR.